(12) United States Patent
Crockett et al.

(10) Patent No.: US 9,720,786 B2
(45) Date of Patent: Aug. 1, 2017

(54) RESOLVING FAILED MIRRORED POINT-IN-TIME COPIES WITH MINIMUM DISRUPTION

(71) Applicant: International Business Machines Corporation, Armonk, NY (US)

(72) Inventors: Robert N. Crockett, Tucson, AZ (US); Eduard A. Diel, Tucson, AZ (US); Lisa J. Gundy, Tucson, AZ (US); Gregory E. McBride, Vail, AZ (US); David M. Shackelford, Tucson, AZ (US); Nadim P. Shehab, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 17 days.

(21) Appl. No.: 14/258,578

(22) Filed: Apr. 22, 2014

(65) Prior Publication Data
US 2015/0301906 A1    Oct. 22, 2015

(51) Int. Cl.
G06F 11/14    (2006.01)
G06F 11/20    (2006.01)

(52) U.S. Cl.
CPC ...... G06F 11/1466 (2013.01); G06F 11/2074 (2013.01); *G06F 11/1456* (2013.01); *G06F 11/1469* (2013.01); *G06F 2201/82* (2013.01); *G06F 2201/84* (2013.01)

(58) Field of Classification Search
CPC ............ G06F 2201/84; G06F 11/1451; G06F 11/1464; G06F 11/1469; G06F 11/1461; G06F 11/1446
See application file for complete search history.

(56) References Cited

U.S. PATENT DOCUMENTS

| | | |
|---|---|---|
| 6,611,901 B1 | 8/2003 | Micka et al. |
| 7,047,390 B2 | 5/2006 | Factor et al. |
| 7,275,178 B2 | 9/2007 | Inoue et al. |
| 7,277,997 B2 | 10/2007 | Vincent |
| 7,437,601 B1 | 10/2008 | Manley et al. |
| 7,603,581 B2 | 10/2009 | Boyd et al. |
| 7,627,729 B2 | 12/2009 | Bartfai et al. |
| 7,734,885 B2 | 6/2010 | Shackelford |

(Continued)

OTHER PUBLICATIONS

Lingfang Zeng et al., HerpRap: A Hybrid Array Architecture Providing Any Point-in-Time Data Tracking for Datacenter, 2012 IEEE Conference on Cluster Computing, 9 pages.

(Continued)

*Primary Examiner* — Jigar Patel
(74) *Attorney, Agent, or Firm* — Terrile, Cannatti, Chambers & Holland, LLP; Stephen A. Terrile

(57) ABSTRACT

When the mirrored point in time copy fails, at that point in time all the data for making the source and target of the point in time copy consistent is available on secondary volumes at disaster recovery site. The data for the source and target of the failed point in time copy are logically and physically equal at that point in time. This logical relationship can be maintained, and protected against ongoing physical updates to the affected tracks on the source secondary volume, by first reading the affected tracks from the source secondary volume, copying the data to the target secondary volume, and then writing the updated track to the source secondary volume.

12 Claims, 4 Drawing Sheets

(56) References Cited

U.S. PATENT DOCUMENTS

| | | |
|---|---|---|
| 7,925,914 B2 | 4/2011 | Akutsu et al. |
| 8,538,928 B2 | 9/2013 | Thompson et al. |
| 2005/0027749 A1* | 2/2005 | Ohno ................. G06F 11/1469 |
| 2005/0071372 A1* | 3/2005 | Bartfai ............... G06F 11/2071 |
| 2005/0071708 A1* | 3/2005 | Bartfai ............... G06F 11/2064 |
| | | 714/6.3 |
| 2005/0102547 A1* | 5/2005 | Keeton ................ G06F 11/008 |
| | | 714/1 |
| 2011/0167044 A1 | 7/2011 | Hiwatashi et al. |
| 2012/0254124 A1 | 10/2012 | Gundy et al. |

OTHER PUBLICATIONS

IBM Corporation, Asynchronous Mirroring Utilizing ESS FlashCopy, 1990, 2013, http://publib.boulder.ibm.com/infocenter/clresctr/vxrx/index.jsp?topic=%2Fcom.ibm.cluster.gpfs.v3r5.gpfs200.doc%2Fbl1adv_essflash.htm.

\* cited by examiner

RESOLVING FAILED MIRRORED POINT-IN-TIME COPIES WITH MINIMUM DISRUPTION

BACKGROUND OF THE INVENTION

Field of the Invention

The present invention relates in general to the field of computers and similar technologies, and in particular to software utilized in this field. Still more particularly, it relates to a method, system and computer-usable medium for resolving failed mirrored copies with minimum disruption.

Description of the Related Art

Data storage systems often include a feature to allow users to make a copy of data at a particular point-in-time (PIT). A point-in-time copy is a copy of the data consistent as of a particular point-in-time, and would not include updates to the data that occur after the point-in-time. Point-in-time copies are created for data duplication, disaster recovery/business continuance, decision support/data mining and data warehousing, and application development and testing.

One data duplication technique for copying a data set at a particular point-in-time is the International Business Machines Corporation's ("IBM") Concurrent Copy feature. Concurrent Copy performs back-up operations while allowing application programs to run. Concurrent Copy insures data consistency by monitoring input/output (I/O) requests to the tracks involved in the Concurrent Copy operation. If an I/O request is about to update a track that has not been duplicated, then the update is delayed until the system saves a copy of the original track image in a cache side file. The track maintained in the side file is then eventually moved over to the target copy location. Concurrent Copy is implemented in a storage controller system, where the storage controller provides one or more host systems access to a storage device, such as a Direct Access Storage Device (DASD), which often comprises numerous interconnected hard disk drives. With Concurrent Copy, data is copied from the DASD or sidefile, to the host system initiating the Concurrent Copy operation, and then to another storage device, such as tape back-up.

Concurrent Copy is representative of a traditional duplication method in which the source data to copy is read from the disk into the host. The host then writes a duplicate physical copy back to the receiving disk. This method uses substantial processing cycles to perform the I/O operations for the copying and disk storage, and can take considerable time. In fact, the amount of time and resources consumed are directly proportional to the amount of data being copied. The larger the size of the data, the more resources, and time, used.

Another data duplication technique for storage controller systems is the often referred to as the FlashCopy data duplication technique available from International Business Machines, Inc. The FlashCopy data duplication technique makes it possible to create, nearly instantaneously, point-in-time snapshot copies of entire logical volumes or data sets. Using this FlashCopy data duplication technique, the copies are immediately available for both read and write access. With the FlashCopy data duplication technique, entire volumes may be substantially instantaneously copied to another volume by using the storage systems such as Enterprise Storage Subsystems (ESS). The FlashCopy data duplication technique also provides an ability to flash individual data sets along with support for consistency groups. Consistency groups enhance with FlashCopy data duplication technique to create a consistent point-in-time copy across multiple volumes, and even across multiple ESSs, thus managing the consistency of dependent writes.

One issue that relates to a point-in-time copy such as the FlashCopy data duplication technique arises when a copy operation fails while mirroring the point in time copy across an asynchronous remote mirror (XRC). When a failure occurs during the copy operation while mirroring, the mirror relationship is not necessarily consistent. This inconsistency needs to be resolved for the copies to be valid. One known method for resolving this type of problem suspends an XRC pair for the target of the FlashCopy and resynchronizes the copies using a bitmap which contains the tracks affected by the FlashCopy (as well as other unrelated changes). However, this method can have significant performance issues and can also impact the recovery point objective (RPO) of the disaster recovery (DR) site. A less disruptive method of recovering from this type of error is desirable.

SUMMARY OF THE INVENTION

In various embodiments, when the mirrored point in time copy fails, at that point in time all the data for making the source and target of the point in time copy consistent is available on secondary volumes at disaster recovery site. The data for the source and target of the failed point in time copy are logically and physically equal at that point in time. This logical relationship can be maintained, and protected against ongoing physical updates to the affected tracks on the source secondary volume, by first reading the affected tracks from the source secondary volume, copying the data to the target secondary volume, and then writing the updated track to the source secondary volume.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
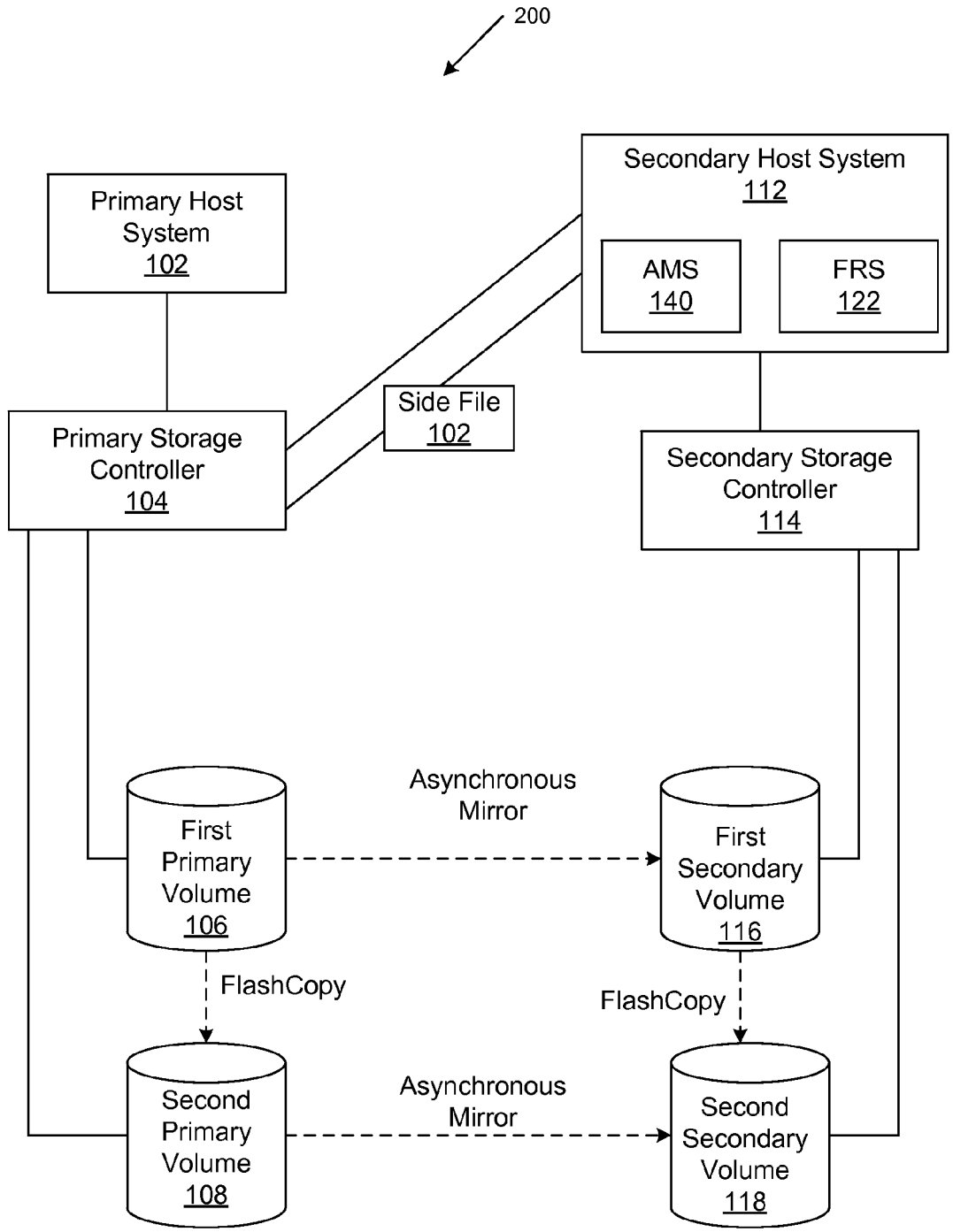
FIG. 1 shows a block diagram of an asynchronous mirror environment in which embodiments are implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. Referring now to FIG. 1, an asynchronous mirror environment 100 is shown. A solid line between two components in FIG. 1 indicates that the components can directly communicate with one another, such as over a network or a direct cable connection, without having to pass communication through any other component shown in FIG. 1. By comparison, a dashed line between one component and another component in FIG. 1 indicates an operation performed in relation to the latter component with reference to the former component.

The system 100 includes a primary host system 102, a primary storage controller 104, a first primary volume (P1) 106, and a second primary volume (P2) 108. The host system 102, the controller 104, and the volumes 106 and 108 may be located in a local manner in relation to one another. For instance, all these components may be located in the same room, the same building or the same campus.

The system 100 also includes a secondary host system 112, a secondary storage controller 114, a first secondary volume (S1) 116, and a second secondary volume (S2) 118. The host system 112, the controller 114, and the volumes 116 and 118 also may be located in a local manner in relation to one another. However, the host system 112, the controller 114, and the volumes 116 and 118 may be located remote to the host system 102, the controller 104, and the volumes 106 and 108. For instance, the former components may be located in a different building, a different city, a different state, or even in a different country than the latter components.

The terminology "primary" and "secondary" is used herein mainly to distinguish the components from each other. Additionally, in certain embodiments, the secondary components may be considered as subordinate to the primary components. Furthermore, the primary storage controller 104 and the secondary storage controller 114 may also be referred to as a primary storage controller device and a secondary storage controller device, respectively.

The primary host system 102 may include one or more data processing system, like server computer devices, which process information by writing data to, updating data on, and reading data from the first primary volume 106. In this respect, the primary host system 102 interacts with the primary storage controller 104. The primary storage controller 104 in turn directly interacts with the primary volumes 106 and 108.

The primary volumes 106 and 108 may be logical storage volumes on the same or different storage devices, such as hard disk drives, arrays of hard disk drives, and so on. The first primary volume 106 may periodically be flash-copied to the second primary volume 108, as indicated by a dashed line in FIG. 1. That is, as desired, a point-in-time copy of the first primary volume 106 may be made to the second primary volume 108.

The primary storage controller 104 directly interacts with the secondary host system 112 in at least two different ways. First, the primary storage controller 104 may store data in a side file 110, which is then retrieved by the secondary host system 112. The side file 110 is a logical data file that is stored on a volume of a storage device, in the cache of the primary storage controller 104, and/or on a non-volatile storage device, among other places. Second, the primary storage controller 104 may directly communicate with the secondary host system 112 without using the side file 110.

The secondary host system 112 may also include one or more data processing systems. The secondary host system 112 is responsible for at least in part managing an asynchronous mirroring relationship between the first primary volume 106 and the first secondary volume 116. That is, the first primary volume 106 is asynchronously mirrored to the first secondary volume 116. Additionally, the secondary host system is also responsible for resolving failures that may occur during any asynchronous mirroring operation. Thus, the secondary host system 112 includes an asynchronous mirroring system (AMS) 140 as well as a failure resolution system (FRS) 142

For instance, when the primary host system 102 performs a write or update operation, the host system 102 sends the operation to the primary storage controller 104. The primary storage controller 104 performs the operation in relation to the first primary volume 106, and stores the operation in the side file 110. The primary storage controller 104 signals back to the primary host system 102 that the operation has been completed. At some point later in time, the secondary host system 112 retrieves the operation from the side file 110, and interacts with the secondary storage controller 114 to cause the operation to be performed in relation to the first secondary volume 116. As such, the current contents of the first secondary volume 116 mirror the past contents of the first primary volume 106.

Thus, like the primary host system 102, the primary storage controller 104, and the primary volumes 106 and 108, the secondary host system 112 interacts with the secondary storage controller 104, which in turn directly interacts with the secondary volumes 116 and 118. Like the primary volumes 106 and 108, the secondary volumes 116 and 118 may be logical storage volumes on the same or different storage devices. The storage devices implementing the secondary volumes 116 and 118 may be hard disk drives, arrays of hard disk drives, and so on, and are different than the storage devices implementing the primary volumes 106 and 108.

The first secondary volume 116 may periodically be point in time copies (e.g., Flash-Copied) to the second secondary volume 118, as indicated by a dashed line in FIG. 1. For instance, it is first determined that the configuration and state of the volumes 106, 108, and 116, and 118 permit flash-copying of the first primary volume 106 to the second primary volume 108 and flash-copying of the first secondary volume 116 to the second secondary volume 118. Thereafter, the primary storage controller 104 initiates flash-copying from the first primary volume 106 to the second primary volume 108, reports back to the primary host system 102 that flash-copying has succeeding, and writes a flash-copy operation to the side file 110.

The secondary host system 112 reads the flash-copy operation at some later point in time, and instructs the secondary storage controller 114 to flash-copy the first secondary volume 116 to the second secondary volume 118. The secondary storage controller 114 then initiates flash-copying from the first secondary volume 116 to the second secondary volume 118. Once flash-copying has been completed, the contents of the second secondary volume 118 mirror the past contents of the second primary volume 108.

There are thus four logical operations indicated by dashed lines in FIG. 1. First, the first primary volume 106 is asynchronously mirrored to the first secondary volume 116. Second, the second primary volume 108 is asynchronously mirrored to the second secondary volume 118. Third, the first primary volume 106 is flash-copied to the second primary volume 108. Fourth, the second primary volume 108 is flash-copied to the second secondary volume 118.

When a Flash-Copy operation between secondary volumes S1 and S2 fails, the failure resolution system 142 establishes control data structures to track a logical correspondence between the volumes. In certain embodiments, the data structure includes a bitmap which is associated with each of the two secondary volumes S1 and S2, with the bits for each track being set active (e.g., set high). The failure resolution system 142 also generates a relationship control block, listing the source volume as S1, target volume S2, and extents copied equal to the extents which would have been copied by the point in time copy operation. The control data structures are hardened within the failure resolution system 142 to a state data set which functions as a persistent store for the control information. In certain embodiments the state data set comprises a control bitmap.

Subsequent updates to either volume S1 or S2 are first checked against the control structures representing a failed point in time copy operation. If the updates do not intersect with the control data structures, the update is applied normally. If the update intersects with the control data structures, the control data structures are examined.

Figure 2:
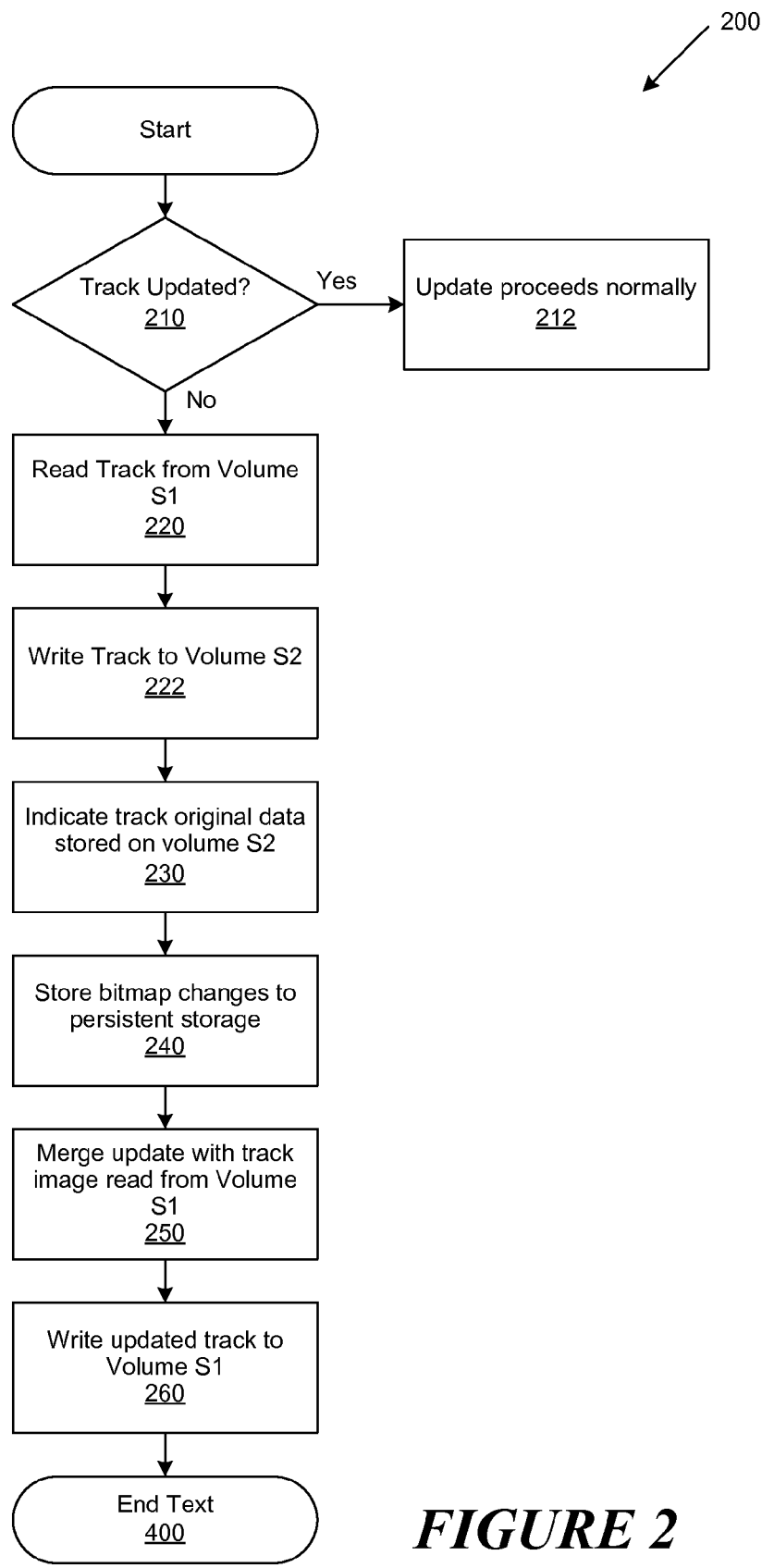
FIG. 2 shows a flow chart of the operation of a failure resolution system.

Referring to FIG. 2, a flow chart of a volume 1 failure resolution operation 200 when processing volume S1 is shown. The volume 1 failure resolution operation 200 is followed if an update is provided to volume S1. More specifically, at step 210, the failure resolution system 142 determines whether the bit corresponding to the updated track in a control bitmap is set inactive (e.g., is set to zero). If so, then the track has already been protected, and the update proceeds normally at step 212. If the failure resolution system 142 determines that the bit corresponding to the updated track in the control bitmap is set active (e.g., is set to one), then the original data on the track needs to be copied to S2 before the update can be applied to volume S1. Accordingly, at step 220, the failure resolution system 142 reads the track from volume S1. Next, at step 222, the failure resolution system 142 writes the track to volume S2. Next, at step 230, the failure resolution system 142 resets to inactive the bit corresponding to the updated track (i.e., turns off the bit) thus indicating that the original data is now stored on volume S2. Next, at step 240, the failure resolution system 142 stores the bitmap changes to persistent storage thus hardening these changes. Next, at step 250, the failure resolution system 142 merges the update with the track image read from volume S1. Next at step 260, the failure resolution system 142 writes the updated track to volume S1 and completes the volume 1 failure resolution operation.

Figure 3:
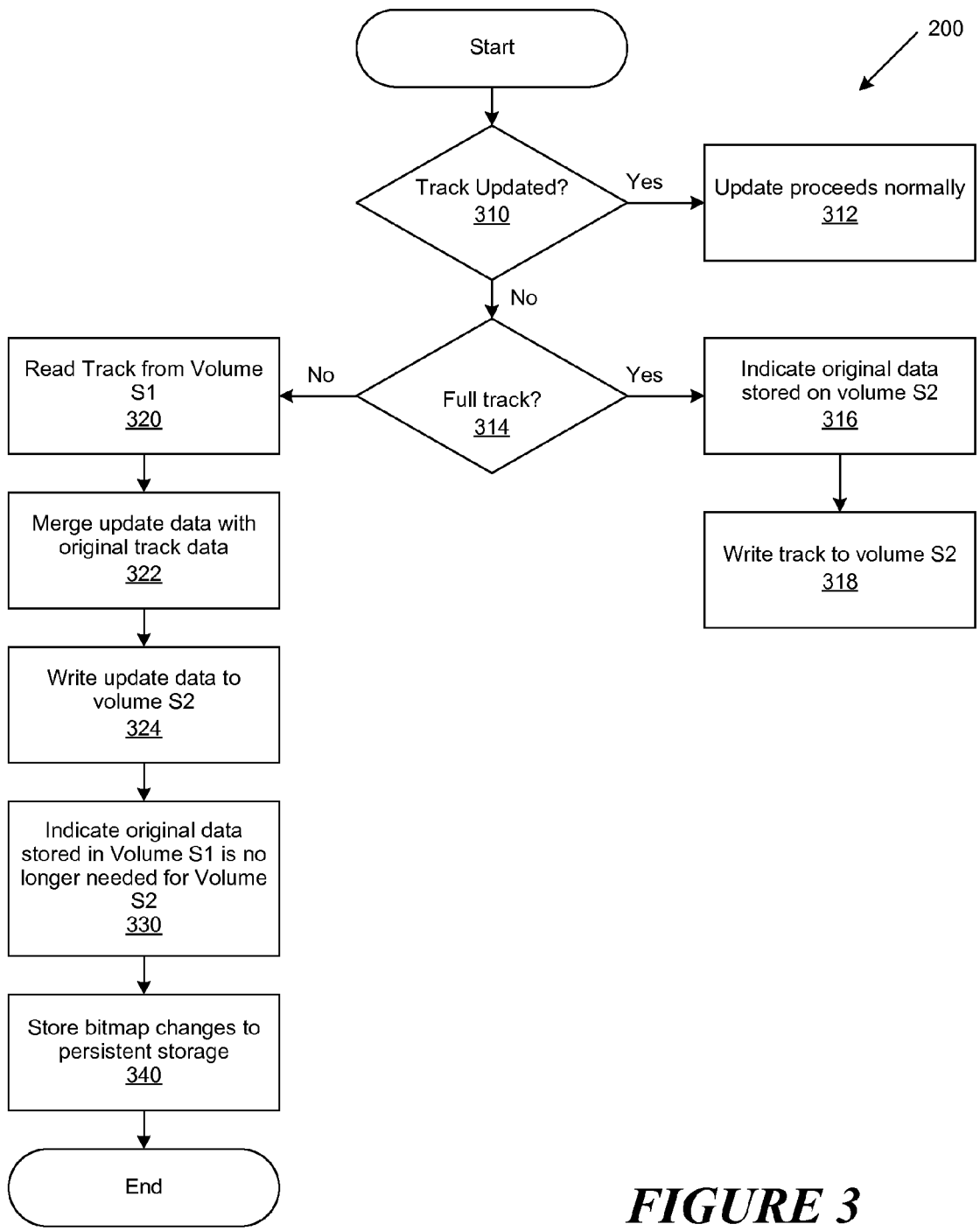
FIG. 3 shows a flow chart of another operation of a failure resolution system.

Referring to FIG. 3, a flow chart of a volume 2 failure resolution operation 300 when processing volume S2 is shown. The volume 2 failure resolution operation 300 is followed if an update is provided to volume S2. More specifically, at step 310, the failure resolution system 142 determines whether the bit corresponding to the updated track in the control bitmap is set inactive (e.g., is set to zero). If so, then the original data is already stored on value S2 and the update proceeds normally at step 312. If the failure resolution system 142 determines that the bit corresponding to the updated track in the control bitmap is set active (e.g., is set to one), then the original data on the track is stored on volume S1. Thus at step 314, the failure resolution system 142 determines whether the update is for a full track of information. If the update is for a full track then the data stored on volume S1 is not needed. At step 316, the failure resolution system 142 turns off the bits in the bitmap to indicate that the original data is now stored on volume S2. (This original data is also overlaid on the track; however, this condition does not affect the bit setting.) Next, at step 318, the failure resolution system 142 writes the track to volume S2.

If the failure resolution system 142 determines that the bit corresponding to the updated track is set active (via step 310) and the update is not for a full track of information (via step 314) then the failure resolution system 142 reads the track from volume S1 at step 320. Next, at step 322, the failure resolution system 142 merges the update data to the original track data. Next at step 324, the failure resolution system 142 writes the updated track to volume S2. Next, at step 330, the failure resolution system 142 resets to inactive the bit corresponding to the updated track (i.e., turns off the bit) thus indicating that the original data stored in volume S1 is no longer needed for volume S2. Next, at step 340, the failure resolution system 142 stores the bitmap changes to persistent storage thus hardening these changes and completes the volume 2 failure resolution operation.

In certain embodiments, to minimize the amount of collision detection needed by the failure resolution system 142, data may be proactively copied from volume S1 to volume S2. When performing this proactive operation, a background copy task goes through the bitmap and copies tracks from volume S1 to volume S2 when the corresponding bitmap bit is one. The failure resolution system 142 then turns off the bitmap bit corresponding to the proactively copies tracks so that subsequent updates can proceed normally. The failure resolution system 142 then stores the bitmap changes to persistent storage thus hardening these changes.

In certain embodiments, the update and optional background copy tasks can occur simultaneously. The failure resolution system 142 uses a serialization operation between the various asynchronous tasks to ensure that the same track is not copied from volume S1 to volume S2 more than once. In various embodiments, the serialization operation may be any technique known in the art, such as a mutex, semaphore, compare and swap, enqueue, etc. When performing the update and optional background copy operations, after all tracks in the relationship have been copied to volume S2, the control structures can be deleted and removed from persistent storage.

In certain embodiments, if while performing the point in time copy operation, volume S2 becomes suspended before the point in time copy can be completed, then the next time volume S2 is resynchronized the residual bits in the control structure are merged with the asynchronous mirror suspend bits. The control structures can then be deleted.

In certain embodiments, if while performing the point in time copy operation, volume S1 becomes suspended before the point in time copy can be completed, the failure resolution system 142 may use one of two operations to address this issue. More specifically, the failure resolution system 142 completes the background copy from volume S1 to volume S2 using the now static data on volume S1, or the failure resolution system 142 resynchronizes volume S1 before that background copy can complete. If the volume S1 resynchronization begins before the background copy completes, the resynchronization of volume S1 acts like an update to volume S1 where the original data from volume S1 is copied to volume S2 before the resynchronization of that track is performed on volume S1.

In certain embodiments, if the asynchronous mirror is used for disaster recovery (for example using a zero-suspend type of operation) before the data is copied from volume S1 to volume S2, the asynchronous mirror copy is completed before the recovery is processed by the failure resolution system 142. More specifically, in certain embodiments, at least one of two types of disaster recovery operations may apply. These disaster recovery operations include a disaster recovery test operation and an actual recovery after disaster operation. With both of these operations, the failed point in time copy which is being resolved is completed before the recovered data can be used. A typical procedure for a disaster recovery test operation in an extended remote copy (XRC) environment is to perform a "zero suspend flashcopy" (which makes a copy of the secondary volumes and control information to a tertiary set of volumes) and then perform an XRC recovery (XRECOVER) operation on the tertiary volumes, which finalizes the data and prepares it for use by applications. A typical procedure for an actual disaster recovery event is also to make a copy (e.g., via a normal flashcopy operation rather than a zero-suspend flashcopy operation) of the secondary volumes to tertiary volumes followed by finalizing the data via an XRECOVER operation.

With either of these operations, if there is any pending failed point in time copy operation between a volume S1 and volume S2, which was being resolved by the FRS 142, some or all of a plurality of steps are performed by the FRS 142. More specifically, the FRS 142 includes a copy of certain FRS control information (which identifies differences between each pair of volumes S1 and S2 that are still outstanding) in the data which is copied as part of the disaster recovery procedure. The XRECOVER operation uses tertiary volumes T1 and T2 which correspond to secondary volumes S1 and S2. The XRECOVER operation is modified to include an instance of the FRS 142 using the tertiary volumes T1 and T2 as its volumes. Additionally, the XRECOVER operation may apply some updates to the tertiary volumes T1 and T2 which were held in an XRC journal. If the updates intersect with a previously failed point-in-time copy, the FRS 142 applies the data and resolves the conflicts. After the XRECOVER operation finishes applying data, the remainder of any background copy for previously failed point-in-time copies is allowed to complete before the data is made available to applications.

In certain embodiments, multiple failed point in time copies might intersect a given update to volume S1 or volume S2. If there are multiple failed point in time copies which intersect a given update to volume S1 or volume S2, multiple sets of control data are kept and the update is checked against each set of control data in turn.

Additionally, it will be appreciated that while the failure recovery operations are in terms of two volumes S1 and S2, the failure recovery operations apply equally when volume S1 and volume S2 are the same volume. A plurality of track extents may comprise the failed point in time copy operation, in which case a sparse bitmap starts off with '1' bits for tracks which are in extents and '0' bits which are not in extents. The bitmap may comprise the entire volume or the bitmap may start and end in the middle of the volume, with the first bit representing the first track in the earliest extent and the last bit representing the last track in the last extent.

Additionally, it will be appreciated that while the failure recovery operations are described with the use of bitmaps and extents, many other data structures may be substituted without diverging from the invention. Additionally, it will be appreciated that the control structures may be stored in any persistent storage, including but not limited to data sets on disk, static memory, flash memory, and coupling facility structures.

Figure 4:
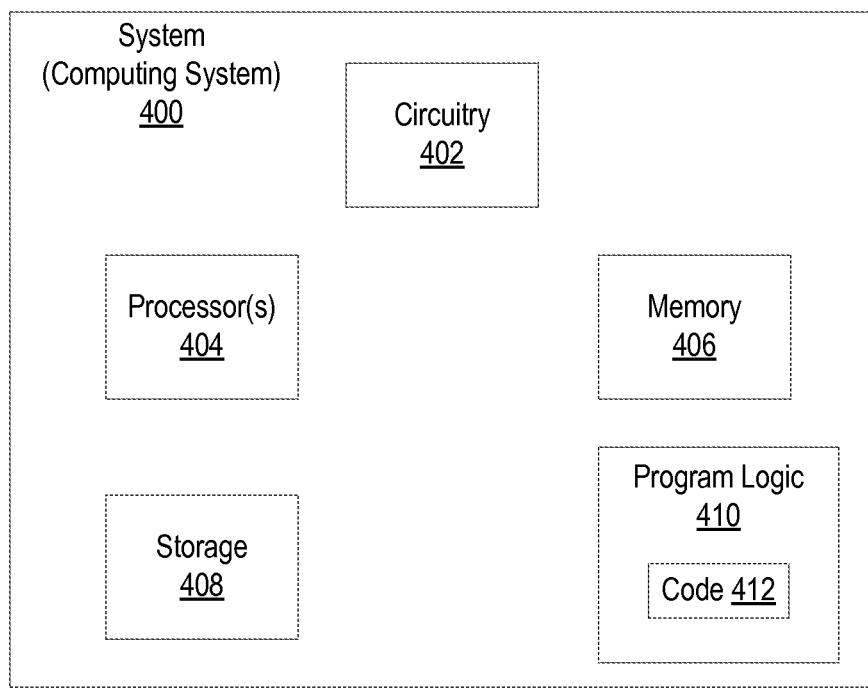
FIG. 4 shows a block diagram of a data processing system.

Referring to FIG. 4, an architecture of a data processing system 400 is shown. In certain embodiments the host 102 and the storage controller 104 of the environment 100 may be implemented in accordance with the architecture of the data processing system 400. The data processing system 400 may also be referred to as a computer system or generally a system, and may include a circuitry 402 that may in certain embodiments include a processor 404. The system 400 may also include a memory 406 (e.g., a volatile memory device), and storage 408. The storage 408 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 408 may comprise an internal storage device, an attached storage device and/or a network accessible storage device. The system 400 may include a program logic 410 including code 412 that may be loaded into the memory 406 and executed by the processor 404 or circuitry 402. In certain embodiments the code 412 includes some or all of the asynchronous mirroring system 140 and/or the failure resolution system (FRS) 142. In certain embodiments, the program logic 410 including code 412 may be stored in the storage 408. In certain other embodiments, the program logic 410 may be implemented in the circuitry 402. Therefore, while FIG. 4 shows the program logic 410 separately from the other elements, the program logic 410 may be implemented in the memory 406 and/or the circuitry 402.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Although the present invention has been described in detail, it should be understood that various changes, substitutions and alterations can be made hereto without departing from the spirit and scope of the invention as defined by the appended claims.

What is claimed is:

1. A computer-implemented method for resolving failed mirrored point in time copies, comprising:
    performing a mirrored point in time copy operation within an asynchronous remote mirror environment;
    determining when the mirrored point in time copy fails;
    identifying a point in time when the mirrored point in time copy fails, at that point in time all the data for making the source and target of the point in time copy consistent is available on secondary volumes at a disaster recovery site;
    maintaining and protecting a logical relationship between the source and the target of the failed point in time copy to prevent ongoing physical updates to any affected tracks on the source secondary volume as data for the source and target of the failed point in time copy are logically and physically equal at that point in time; and
    establishing a control data structure to track a logical correspondence between the source secondary volume and the target secondary volume when a mirrored point in time copy between the source secondary volume and the target secondary volume fails; and wherein
    the performing and determining are performed by an asynchronous mirroring system; and,
    the identifying, maintaining and protecting and establishing are performed by a failure resolution system.

2. The method of claim 1, further comprising:
    reading the affected tracks from the source secondary volume;
    copying the data to the target secondary volume; and
    writing the updated track to the source secondary volume.

3. The method of claim 1, wherein:

the control data structure comprises a bitmap associated with each of the target secondary volume and the source secondary volume.

4. The method of claim 1, wherein:

the control data structures are hardened to a state data set which functions as a persistent store for the control information.

5. A system comprising:

a processor;

a data bus coupled to the processor; and a computer-usable medium embodying computer program code, the computer-usable medium being coupled to the data bus, the computer program code used for resolving failed mirrored point in time copies and comprising instructions executable by the processor and configured for:

performing a mirrored point in time copy operation within an asynchronous remote mirror environment;

determining when the mirrored point in time copy fails;

identifying a point in time when the mirrored point in time copy fails, at that point in time all the data for making the source and target of the point in time copy consistent is available on secondary volumes at a disaster recovery site;

maintaining and protecting a logical relationship between the source and the target of the failed point in time copy to prevent ongoing physical updates to any affected tracks on the source secondary volume as data for the source and target of the failed point in time copy are logically and physically equal at that point in time; and, establishing a control data structure to track a logical correspondence between the source secondary volume and the target secondary volume when a mirrored point in time copy between the source secondary volume and the target secondary volume fails; and wherein the performing and determining are performed by an asynchronous mirroring system; and, the identifying, maintaining and protecting and establishing are performed by a failure resolution system.

6. The system of claim 5, wherein the instructions are further configured for:

reading the affected tracks from the source secondary volume;

copying the data to the target secondary volume; and writing the updated track to the source secondary volume.

7. The system of claim 5, wherein:

the control data structure comprises a bitmap associated with each of the target secondary volume and the source secondary volume.

8. The system of claim 7, wherein:

the control data structures are hardened to a state data set which functions as a persistent store for the control information.

9. A computer-readable storage medium embodying computer program code, the computer program code comprising computer executable instructions configured for:

performing a mirrored point in time copy operation within an asynchronous remote mirror environment;

determining when the mirrored point in time copy fails;

identifying a point in time when the mirrored point in time copy fails, at that point in time all the data for making the source and target of the point in time copy consistent is available on secondary volumes at a disaster recovery site;

maintaining and protecting a logical relationship between the source and the target of the failed point in time copy to prevent ongoing physical updates to any affected tracks on the source secondary volume as data for the source and target of the failed point in time copy are logically and physically equal at that point in time; and establishing a control data structure to track a logical correspondence between the source secondary volume and the target secondary volume when a mirrored point in time copy between the source secondary volume and the target secondary volume fails; and wherein the performing and determining are performed by an asynchronous mirroring system; and, the identifying, maintaining and protecting and establishing are performed by a failure resolution system.

10. The computer-readable storage medium of claim 9, further comprising computer executable instructions for:

reading the affected tracks from the source secondary volume;

copying the data to the target secondary volume; and writing the updated track to the source secondary volume.

11. The computer-readable storage medium of claim 9, wherein:

the control data structure comprises a bitmap associated with each of the target secondary volume and the source secondary volume.

12. The computer-readable storage medium of claim 9, wherein:

the control data structures are hardened to a state data set which functions as a persistent store for the control information.

* * * * *